United States Patent

[11] 3,604,977

| [72] | Inventor | Gunter A. G. Hofmann<br>Los Angeles, Calif. |
|---|---|---|
| [21] | Appl. No. | 791,216 |
| [22] | Filed | Jan. 15, 1969 |
| [45] | Patented | Sept. 14, 1971 |
| [73] | Assignee | Hughes Aircraft Company<br>Culver City, Calif. |

[54] CROSS FIELD SWITCHING DEVICE WITH A SLOTTED ELECTRODE
9 Claims, 9 Drawing Figs.

[52] U.S. Cl. .................................................. 315/267,
328/251, 313/86, 313/157, 313/161, 315/39,
315/39.3
[51] Int. Cl. ....................................... H05b 41/16,
H05b 41/24
[50] Field of Search ........................................... 328/249,
250, 251; 313/84, 85, 86, 160, 161, 156, 157;
315/39, 39.3, 267

[56] References Cited
UNITED STATES PATENTS

| 3,458,754 | 7/1969 | Peters, Jr. | 315/39.3 |
| 3,458,753 | 7/1969 | Staats | 315/39.3 |

Primary Examiner—John W. Huckert
Assistant Examiner—B. Estrin
Attorneys—James K. Haskell and Allen A. Dicke, Jr ABSTRACT: The switching device has an anode and a cathode with a gas-filled annular space therebetween. When an axial magnetic field above a critical value is applied to the gas-filled space, and after initation, cascading ionization occurs for conduction. The magnetic field above the critical value is supplied by a substantially fixed field source, and reduction below the critical value is accomplished by employing one of the electrodes as a coil through which current can be passed to change the total magnetic field with respect to the critical value.

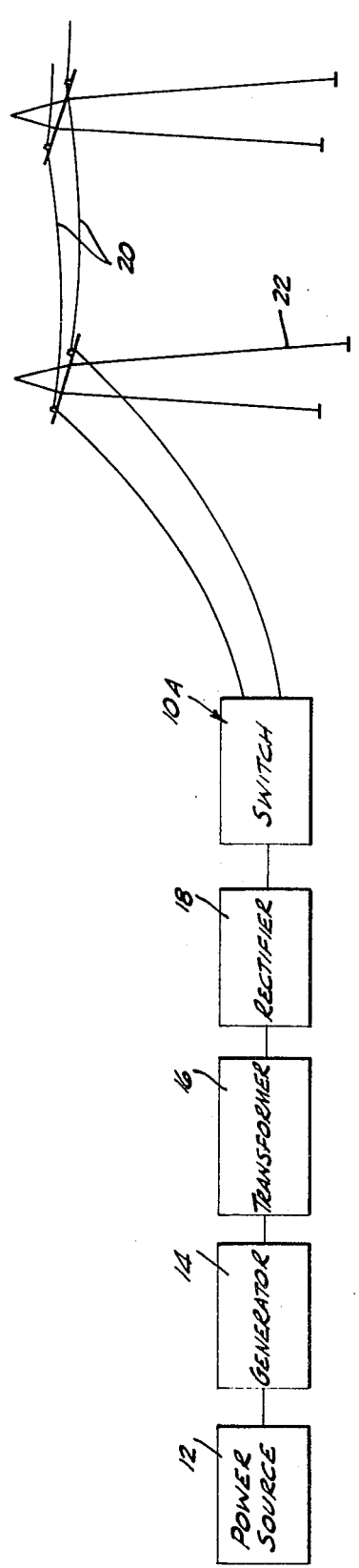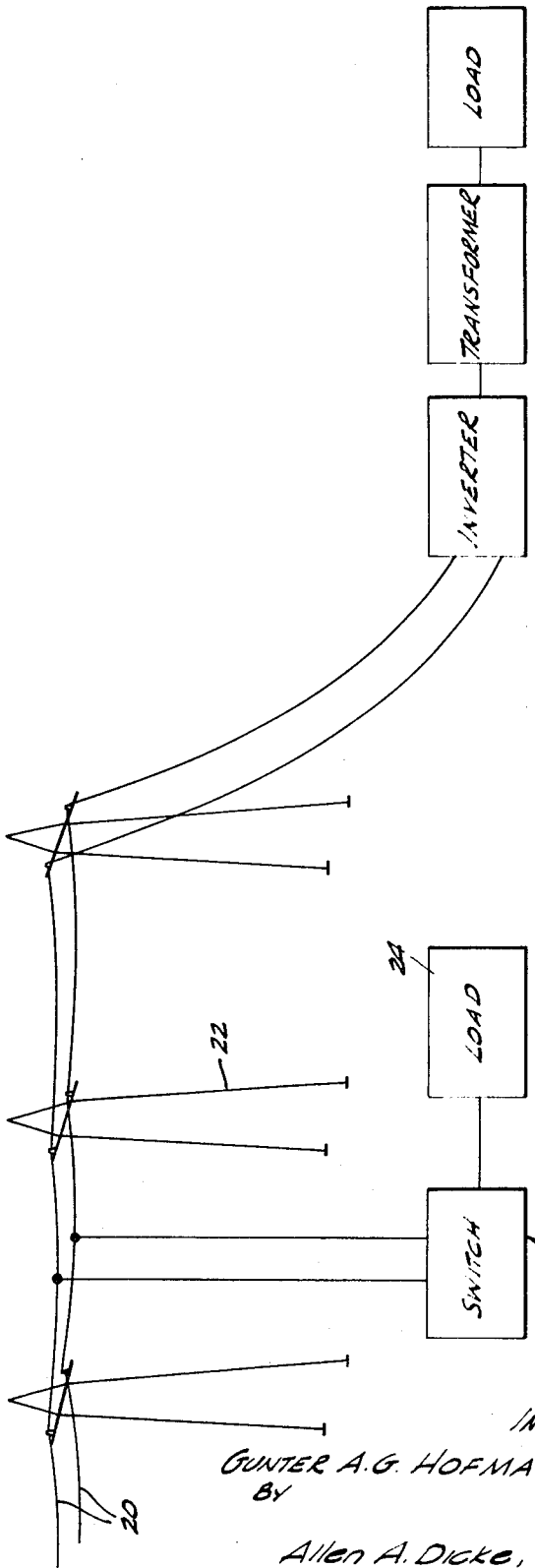

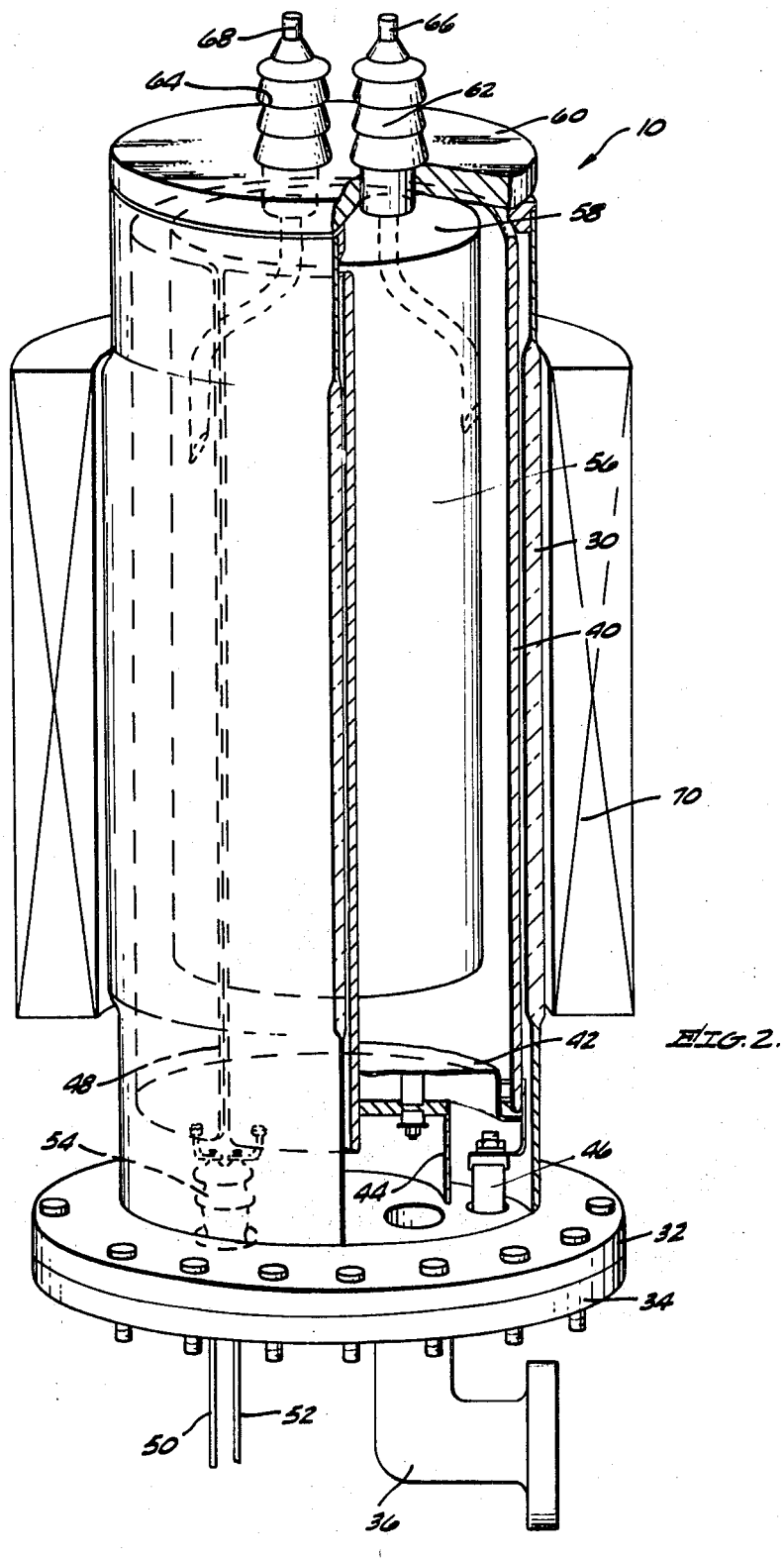

CROSS FIELD SWITCHING DEVICE WITH A SLOTTED ELECTRODE

BACKGROUND

This invention is directed to a switching device of the crossed-field type, employing Penning discharge, wherein regulation of the magnetic field strength controls electron path length so that this path length is above or below a critical value.

Switching devices of a general type are known in the art. Penning U.S. Pat. No. 2,182,736 describes such a switching device, while Boucher, et al. U.S. Pat. No. 3,213,893 and Boucher U.S. Pat. No. 3,215,939 describe improvements thereon. All three of these devices are primarily directed to rectifier-type switching, and the Boucher and Boucher, et al. patents are directed to an improvement wherein the shape of the magnetic field improves rectifying action by providing a lower breakdown voltage in one direction than the other between the two electrodes which form the gas-filled space. The Penning structure suffers from the problem that since the magnetic field is supplied from a single external coil, the induction thereof is high and changing the field to below the critical value is time consuming. Accordingly, offswitching time is limited by coil induction rather than by other limitations of the device.

With continually increasing electric power demands, there is increased need to exploit sources of power farther away from the users of large amounts of electric power, with the consequent need for transporting the electric power over greater distances. In the United States, a number of our larger electric power consuming areas are at some distance from primary power sources, such as sites for generation of hydroelectric power, coal deposits and oil deposits. Accordingly, it becomes necessary to transport electricity over greater distances. It is known that to transport high powers over long distances, DC can be economically superior to AC. This has already led to a number of high power DC transmission lines, such as the Pacific Intertie presently under construction between the Columbia River and Los Angeles. One limitation to the wide use of DC is the lack of practical high power DC switching devices. By making the continuous operation of a Penning Discharge device possible over prolonged periods of time, the present invention provides means to make such a DC switch.

SUMMARY

In order to aid in the understanding of this invention, it can be stated in essentially summary form that it is directed to a switching device having first and second electrodes. The interelectrode space is gas filled to such a pressure that the electron path length is below a critical value when an electric field is applied without a magnetic field, and is above a critical value when a magnetic field above a critical value is applied at right angles to the electric field. Furthermore, the device includes a first magnetic field which is substantially constant in value in the gas-filled space and a second magnetic field which acts with respect to the first magnetic field to regulate the total magnetic field with respect to the critical value of the magnetic field.

Accordingly, it is an object of this invention to provide a switching device of the crossed-field type suitable for rapid offswitching. It is another object to provide a switching device having an annular gas-filled space and first and second magnetic field sources to apply a magnetic field to the annular space. It is another object to provide a first magnetic field source which is substantially constant in field strength and a second magnetic field source which has variable field strength. It is still another object to provide a second magnetic field source which is capable of rapidly changing the total magnetic field in the annular space with respect to the critical value of the magnetic field. It is a further object to provide a first magnetic field source which provides a substantially constant magnetic field above the critical value and to provide a second variable magnetic field source which is capable of reducing the total field below the critical value. Other objects and advantages of this invention will become apparent from the study of following parts of the specification, the claims and the attached drawings.

DESCRIPTION OF THE DRAWINGS

FIG. 1A is a schematic drawing of a portion of a power system of the nature in which a switch device of this invention is employed.

FIG. 1B is a schematic drawing of another portion of such a power system.

FIG. 2 is a perspective view, with parts broken away, of the switching device of this invention.

DESCRIPTION

Figure 3:
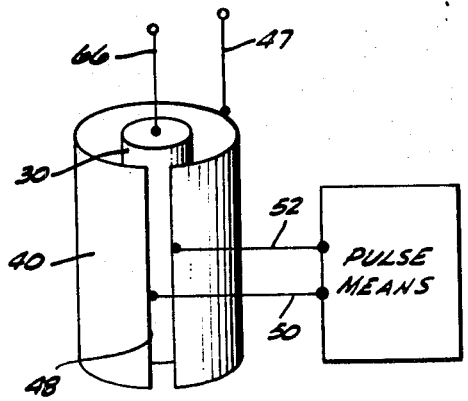
FIG. 3 is a schematic drawing showing one arrangement of the electrodes of the switching device of this invention.

The switching device is generally indicated at 10 in FIG. 2. Referring to FIGS. 1A and 1B, which illustrate the manner in which the switching device 10 is employed in a circuit, two different applications of the switching device are indicated at 10A and 10B. In FIG. 1A, power source 12 drives generator 14. Power source 12 can be of any conventional type, including hydroelectric, internal combustion engine, or steam, including nuclear heated steam. Generator 14 generates alternating current electricity of suitable voltage and frequency for that portion of the system. It supplies alternating current transformer 16 which changes the voltage to one suitable for rectification and direct transmission. When direct current is employed for economic, long-distance power transmission, this usually requires an increase in voltage at the transformer output, as compared to its input. Transformer 16 supplies rectifier 18, which preferably includes a plurality of rectifiers arranged in bridge form, depending on the plurality of phases at the output of transformer 16.

The rectifier in turn supplies transmission lines 20, through switch 10A. The presence of switch 10A, which can also serve as circuit breaker in an appropriate circuit combination, permits the use of uncontrolled rectifiers for the rectifier 18. This can lead to substantial savings over the use of controlled rectifiers such as are required by the present state of the art in the absence of a DC switch such as 10A. Transmission lines 20 are supported on a plurality of towers 22 which support the lines in insulated fashion away from the terrain, from the area of generation to the area where the electric power is to be employed. In some cases, transmission lines 20 may be buried, and in some cases they will be underwater transmission lines. Furthermore, while two transmission lines are preferable so that the voltage to ground can be divided between them, some systems may employ a ground return, but such is not preferred for high power systems.

Referring to FIG. 1B, switch 10B is connected between transmission lines 20 and load 24. While a simple switch and simple load are indicated, there are preferably two switches at 10B, in order to switch the power coming from each of transmission lines 20. Furthermore, load 24 may be a direct current load operating at transmission line voltage, or it may be an inverter-transformer-load system. Switch 10B, with its load 24, illustrates the use of switch 10B for a tap on the transmission line. In the appropriate circuit combination, switch 10B can also serve as a circuit breaker for the tap.

Referring to FIG. 2, the switching device 10 comprises housing 30 which is carried upon bottom flange 32. Bottom flange 32 is in turn mounted upon base flange 34, and they are secured together to provide a tight seal. Base flange 34 stands upon foot 36 for supporting the switch device structure. Furthermore, the foot 36 serves as a vacuum connection connected to base flange 34 for drawing a suitable vacuum on the interior of housing 30 and then letting into the tube the desired gas (e.g. hydrogen) at the required pressure. Housing 30, together with bottom flange 34, serves as a suitable vacuumtight envelope.

Cathode 40 is in the form of a slotted cylindrical tube. It is spaced inwardly from housing 30. Cathode 40 has a lower cap 42 by which it is supported from base flange 34 by means of standoff 44. Lower cap 42 does not need to effect closure, but simply provides mechanical support for the cathode and reduces plasma end losses. Additionally, the cathode can be supported from flange 34 by standoffs such as 46. Where an additional conductor to the center of cathode 40 is desired, standoff 46 can carry such a conductor 47, see FIG. 3. By this construction, the entire cathode can be withdrawn through the large opening in bottom flange 32 when the flanges are separated for inspection and service of the cathode and inspection and service of the interior of housing 30. Cathode 40 is metallic and can be made of stainless steel. Cathode 40 preferably has an axial slot 48 to prevent the circumferential circulation of current during switching transients, when the axial magnetic field changes with time.

Electrical connection to cathode 40 is managed by leads 47, 50 and 52. The structure is shown schematically in FIG. 3. Leads 50 and 52 are mounted in insulative leadthrough 54 which is secured to flange 34. On their inner ends, leads 50 and 52 are connected to the cathode on opposite sides of slot 48. By this construction current can be passed circumferentially around the cathode.

Anode 56 is of cylindrical tubular construction and is positioned concentrically with cathode 40 to provide a radial space therebetween having the dimension D. The radial space D is substantially equal at all facing positions of the anode and cathode. Housing 30 has a top cap 60 upon which anode 56 is mounted. The anode is maintained in position by employing anode cap 58 which is secured to the cylindrical anode 56, and in turn carries mounting studs and 64. Mounting studs 62 and 64 provide both mechanical support by being secured to housing cap 60, and provide electrical continuity through the cap by connectors 66 and 68 respectively. Preferably, anode cap 58 is spaced below top cap 60 and connectors 66 and 68 pass through insulative mounting studs 62 and 64 so that connectors 66 and 68 and the entire anode are electrically separated from the housing. Alternatively, top cap 60 be of insulative material.

Magnet 70 is positioned on the exterior of housing 30 in such a manner as to provide magnetic lines of force in the interelectrode space which are substantially parallel to the axis of the electrodes of switching device 10 over at least part of the electrodes' length.

Figure 5:
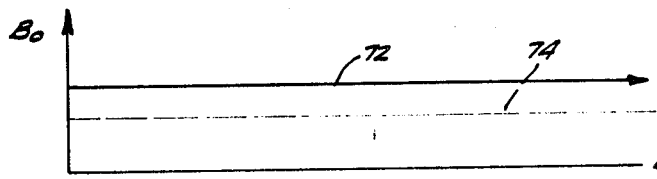
FIG. 5 is a graph showing the magnetic field strength versus time due to the substantially fixed magnetic field in the interelectrode space.

Magnet 70 is illustrated as being an electromagnet because such can conveniently provide the desired field strength. However, in view of the fact that it is not used for switching, a permanent magnet may be employed. The magnetic field strength of magnet 70 is such as to provide a field between 50 and 100 gauss. Seventy gauss was found to be a preferred value for the dimensions given below, used in the experiments to date. The magnetic field strength is illustrated in FIG. 5 by line 72. From FIG. 5 it is to be seen that the magnet is of substantially constant field strength and is above line 74 which is the critical minimum magnetic strength for the device to conduct.

Figure 6:
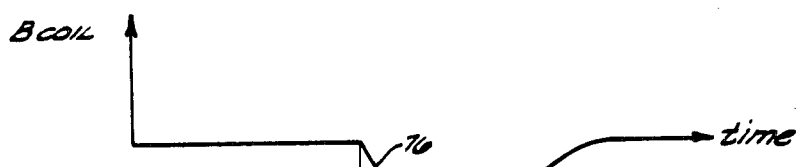
FIG. 6 is a graph of magnetic field strength in the interelectrode space versus time due to the variable magnetic field source.

The interelectrode space is filled with a gas to an appropriate pressure. Referring to FIG. 6 of Boucher, et al. U.S. Pat. No. 3,215,893, the Paschen curve is shown therein. This curve illustrates that at a certain critical product of the interelectrode pressure times the average electron path length $d$ the voltage to breakdown is fairly low. It also illustrates at point A that for a lower product, voltage to cause breakdown is considerably higher. This is because at lower pressure, the ionization mean-free path exceeds the average electron path length $d$, and the ionization rate decreases, which makes it more difficult to sustain the discharge and makes it possible to withstand higher voltage between electrodes before breakdown occurs.

When the magnetic field is off, electron flow is only under the influence of the electric field from the cathode to the anode so that the average electron path length $d$ is substantially equal to the interelectrode space D and is less than the mean-free path length. Thus, there is no sustained ionization, electron flow is low, and the switching device can withstand a high standoff voltage, for it is conditioned approximately below point A on the Paschen curve. However, when the magnetic field is applied to the interelectrode space by magnet 70, the axial magnetic field causes the electron path to follow an inward spiral more circumferential than radial in the interelectrode space to increase electron path length $d$. In this longer path caused by the magnetic field effect, there are sufficient collisions to maintain ionization because the path length $d$ is longer than the mean-free path length. Thus, so long as a sufficient magnetic field is applied, once electrons start flowing the flow is maintained until the magnetic field is cut off. When cut off, the electrons again flow radially so that ionization soon stops.

However, the ionized conduction cannot start again without ionizing ignition. Thus, the presence of the magnetic field above the critical value and the presence of an electric field above the conducting voltage drop of the device does not cause conduction in the absence of ionizing ignition to initiate ionization.

Figure 7:
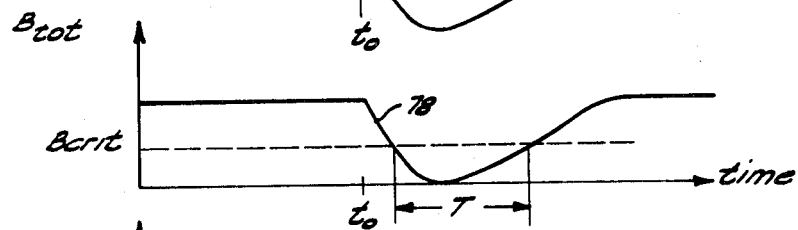
FIG. 7 shows the total magnetic field strength versus time in the interelectrode space.
Figure 8:
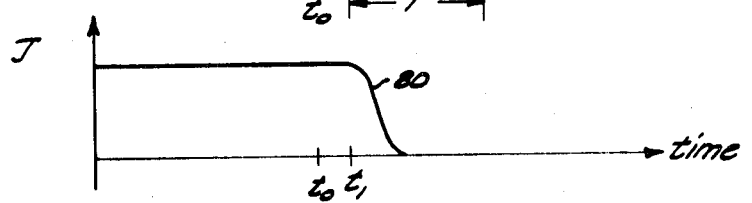
FIG. 8 is a graph of interelectrode current versus time.

Offswitching is accomplished by applying a pulse between leads 50 and 52 in such a direction that the magnetic field produced by this pulse is in opposition to the magnetic field produced by magnet 70. The magnetic field produced by the pulse current flowing circumferentially around cathode 40 is illustrated by curves 76 in FIG. 6. The total magnetic field in the interelectrode space is illustrated by curve 78 in FIG. 7. It is seen that for a time T, the net magnetic field is below the critical value. At that time, self-sustaining, cascading ionization no longer occurs. However, the length of time of T must be sufficiently long that ionization is decreased very nearly to zero before the magnetic field again rises above the critical value. The recovery time of such a device is very fast, well below 1 millisecond, so that the interelectrode current ceases long before the magnetic field again rises above the critical value. This is illustrated in FIG. 8 where curve 80 illustrates the interelectrode current.

When a single turn cathode is used, as is illustrated in FIGS. 2 and 3, a fairly large current is necessary to produce the magnetic field pulse of FIG. 6. In a particular example, the interelectrode radial distance D is about 15 millimeters with an anode diameter of 90 millimeters and an axial length of 300 millimeters. With such a construction, about 3000 amperes is necessary through the single turn cathode of FIGS. 2 and 3 to produce the desired offswitching field shown in FIG. 6.

With the dimensions illustrated, and with a normal hydrogen gas filling of 0.04 millimeters of mercury, the switching device 10 is capable of off switching DC loads of 1,000 amperes and hold off 2525 kilovolts within a recovery time on the order of about 25 microseconds. Thus, it is useful as a DC switch or element of a DC circuit breaker, as illustrated in FIG. 1A and 1B.

Figure 4:
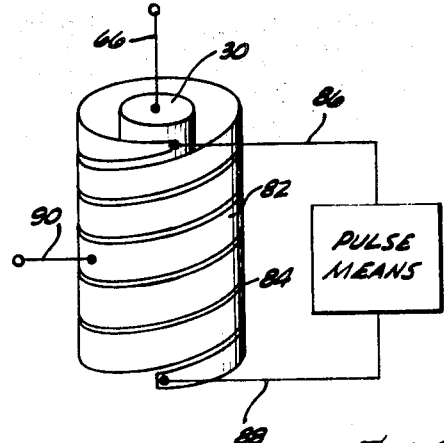
FIG. 4 is a schematic drawing showing of the preferred embodiment of the electrodes of the switching device.

The offswitching pulse is applied from a second excitation source to the leads 50 and 52. This causes a superimposed magnetic field in the interelectrode space of the switch 10. The fairly high value of current required for providing the necessary offswitching magnetic field pulse of FIG. 6, when it is produced by the cathode configuration of FIG. 3, may be objectionable in some cases. FIG. 4 schematically illustrates an anode-cathode construction which reduces the pulse current requirement to obtain the necessary offswitching magnetic field. Anode 30 is again connected by conductor 66 in the same way as shown in FIG. 2. Cathode 82 is in the form of a spiral strip which is laid in cylindrical configuration. In other words, it is the same cylindrical cathode configuration, substantially uniformly spaced from anode 30, but its slot 84 is spiral, rather than axial as is slot 48, to produce a plurality of turns. Leads 86 and 88 are connected to the ends of the spiral cathode, and are led out of the housing similarly to leads 50 and 52. Leads 86 and 88 may be connected for normal cathode current, but if desired the normal current can be separated by a center-tapped cathode lead 90. In this case, normal current passes through lead 90 while lead 86 and 88 are reserved for offswitching pulse currents. With the configuration of FIG. 4, presuming there are 10 turns in cathode 82, a pulse of only 300 amperes is necessary to produce the offswitching magnetic field pulse shown in FIG. 6.

While a one turn and a 10 turn cathode have been specifically described above, it is clear that any reasonable number of turns consistent with cathode structure and the desired amount of current to produce the magnetic offswitching pulse. Furthermore, while the cathode is illustrated as being the winding which carries the current for the offswitching pulse, it is clear that the anode could alternatively or additionally be slotted and connected as a winding to receive an electrical pulse to produce the desired magnetic offswitching pulse.

In operation, assuming the device is filled with a sufficient quantity of an appropriate gas, and is in an ionized conducting state, the continued application of a relatively negative voltage to the cathode, above the voltage drop of the switching device, and assuming the presence of a fixed magnetic field above the critical value in the interelectrode space caused by magnet 70 as is illustrated in FIG. 5, the device will continue conducting. When offswitching is desired, an electric pulse is applied to leads 50 and 52, or 86 and 88, depending on the embodiment employed. This electric pulse is of sufficient magnitude and proper polarity to cause a magnetic filed in the interelectrode space in opposition to the substantially constant field provided by magnet 70, The field resulting from the pulse is illustrated in FIG. 6, and the total field is illustrated in FIG. 7 where it is seen that the interelectrode magnetic field strength goes below the critical value. Thereupon, the electron path length decreases so that cascading, self-sustaining ionization is no longer present in the interelectrode space and conduction is cut off. Despite the application of fairly high voltages, for example 25 kilovolts in the structure illustrated, and the presence of the fixed magnetic field illustrated in FIG. 5, conduction is not reinitiated without employment of a separate means for ionization of the gas in the interelectrode space. Accordingly, the device remains nonconductive. When conduction is desired, ionization means is employed while the magnetic filed in FIG. 5 is present and during the application of an electric field above the voltage drop of the conducting switching device, so that self-sustained ionization begins and continues and the switching device conducts.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A switching device, said switching device comprising:
   an envelope arranged to maintain a reduced pressure within said envelope;
   a cathode electrode within said envelope, said cathode electrode having an active cathode face;
   an anode electrode positioned within said envelope, said anode electrode having an active anode face facing said active cathode face, and positioned substantially equidistant therefrom;
   magnet means positioned with respect to said envelope, said magnet means being adapted to supply a magnetic field in the interelectrode space at an angle with respect to the interelectrode distance;
   electrical connections on said anode electrode and on said cathode electrode;
   a gas at reduced pressure within the interelectrode space so that upon application of a voltage to said electrical connections and ionization of the gas in the interelectrode space, electric current is conducted between said electrodes and ionizing collisions take place in the interelectrode space to maintain ionization;
   one of said electrodes being slotted so as to form a coil of at least one turn, leads connected to said slotted electrode on the opposite sides of said slot so that upon application of an electric pulse to said leads the magnetic field in the interelectrode space is affected.

2. The switching device of claim 1 wherein pulse means is connected to said leads from said slotted electrode, said pulse means being connected to cause an electric current through said electrode in such a direction that the magnetic field in the interelectrode space resulting therefrom is in opposition to the magnetic field resulting from said magnet means so that operation of said pulse means causes the magnetic field in the interelectrode space to decrease below a value where self-sustained ionization occurs.

3. The switching device of claim 2 wherein said electrode is substantially axially slotted so that said slotted electrode forms a substantially one turn coil.

4. The switching device of claim 2 wherein said slot in said slotted electrode is a spiral slot so that said slotted electrode forms a coil of more than one turn.

5. The switching device of claim 4 wherein said anode electrode and said cathode electrode are substantially cylindrical, and one of said electrodes is positioned inside the other of said electrodes.

6. The switching device of claim 5 wherein said slotted electrode is said cathode electrode and said cathode electrode is substantially a cylindrical tube positioned exteriorly of said anode electrode.

7. An electric power supply system, said electric power supply system comprising:
   energy conversion means, said energy conversion means being for converting energy to direct current electric energy;
   an electric load;
   a direct current electric energy transmission line connected between said energy conversion means and said load to transmit energy from said conversion means to said load;
   a switching device connected to said transmission line to control transmission of energy from said conversion means to said load, said switching device comprising:
   an envelope arranged to maintain a reduced pressure within said envelope;
   a cathode electrode within said envelope, said cathode electrode having an active cathode face;
   an anode electrode positioned within said envelope, said anode electrode having an active anode face facing said active cathode face; and positioned substantially equidistant therefrom;
   magnet means positioned with respect to said envelope, said magnet means being adapted to supply a magnetic field in the interelectrode space at an angle with respect to the interelectrode distance;
   electrical connections on said anode electrode and on said cathode electrode;
   a gas at reduced pressure within the interelectrode space so that upon application of a voltage to said electrical connections and ionization of the gas in the interelectrode space, electric current is conducted between said electrodes and ionizing collisions take place in the interelectrode space to maintain ionization; ;

one of said electrodes being slotted so as to form a coil of at least one turn, leads connected to said slotted electrode on the opposite sides of said slot so that upon application of an electric pulse to said leads the magnetic field in the interelectrode space is affected.

8. The electric power supply system of claim 7 wherein said switching device is connected between said energy conversion means and said transmission line.

9. The electric power supply system of claim 7 wherein said switch is connected between said transmission line and said load.

PO-1050
(5/69)

UNITED STATES PATENT OFFICE
CERTIFICATE OF CORRECTION

Patent No. 3,604,977      Dated September 14, 1971

Inventor(s) Gunter A. G. Hofmann

It is certified that error appears in the above-identified patent and that said Letters Patent are hereby corrected as shown below:

Column 3, line 46, after "mounting studs", insert --62--. (Page 8, line 19).

Column 4, line 65, after "hold off", delete "2525" and insert --25--. (Page 12, line 1).

Column 5, line 40, delete "filed" and insert -field--. (Page 13, line 24).

Column 5, lines 48 through 53, delete "Despite the application of ... remains nonconductive." (Amendment dated September 2, 1970).

Signed and sealed this 28th day of March 1972.

(SEAL)
Attest:

EDWARD M. FLETCHER, JR.      ROBERT GOTTSCHALK
Attesting Officer      Commissioner of Patents